(12) United States Patent
Utsumi

(10) Patent No.: US 6,449,360 B1
(45) Date of Patent: Sep. 10, 2002

(54) CLEANING METHOD FOR TELEPHONE NUMBER LIST AND SYSTEM IMPLEMENTED THEREFOR

(75) Inventor: Katsunori Utsumi, Yugawara-machi (JP)

(73) Assignee: Jintec Corporation, Tokyo (JP)

( * ) Notice: Subject to any disclaimer, the term of this patent is extended or adjusted under 35 U.S.C. 154(b) by 0 days.

(21) Appl. No.: 09/250,625

(22) Filed: Feb. 16, 1999

(51) Int. Cl.[7] .......................... H04M 1/00; H04L 12/16; H04L 12/28

(52) U.S. Cl. .................. 379/381; 379/355.06; 379/382; 370/264; 370/904

(58) Field of Search ................................ 379/381, 382, 379/355.01, 188, 112.01, 111

(56) References Cited

U.S. PATENT DOCUMENTS 5,796,816 A * 8/1998 Utsumi ........................ 370/264
5,920,610 A * 7/1999 Arami et al. ................ 379/112

FOREIGN PATENT DOCUMENTS

JP 0777372 A1 * 1/1997
JP WO-9701915 * 1/1997

* cited by examiner

*Primary Examiner*—Ahmad F. Matar
*Assistant Examiner*—Hector Agdeppa
(74) *Attorney, Agent, or Firm*—Barnes & Thornburg

(57) ABSTRACT

A cleaning system retrieves a telephone number from a telephone number list to regard as a called party number and sends a SETUP message to the network, in which a SPEECH or an AUDIO is designated as a bearer capability. In case that an ALERTING or CONNECT message is sent back from the network, the system sends a DISCONNECT message to the network immediately to perform a clear sequence and determines the telephone number effective. In case that a DISCONNECT message is sent back from the network as a result that a call has not been accepted, the system also performs a clear sequence immediately and determines if the telephone number should be treated as an effective number or a null number according to the cause content sent from the network.

4 Claims, 2 Drawing Sheets

CLEANING METHOD FOR TELEPHONE NUMBER LIST AND SYSTEM IMPLEMENTED THEREFOR

TECHNICAL FIELD

The present invention relates to a cleaning system for a telephone number list in a customer list and so forth to be used in telemarketing and the like, for deleting null telephone numbers from the telephone number list using such an apparatus as a personal computer.

BACKGROUND ART

In various businesses utilizing a telephone, a telephone number list of customers is quite important information and thus has to be maintained frequently for deleting telephone numbers which have become unnecessary from the list to prevent degradation of the value of the contained information. The customer information in such lists naturally contains variable information. Namely, the telephone number of the customer may be varied due to termination of use of the registered telephone number, changing to other telephone number, and can be null because of original registration of a wrong number. Such null telephone numbers have to be deleted from the list or to be replaced with correct or new telephone numbers.

Conventionally, maintenance of a customer list has been performed upon giving a phone call to respective customers according to the telephone number list through certain business transactions. Namely, deletion or updating of the null telephone numbers has been done with verifying response from respective customers.

The conventional cleaning method for deleting and updating a telephone number list associating with business inherently may cause significant waste or irrationality in certain type of businesses. Namely, since it is not avoidable to make a phone call to the customers having null telephone numbers which should be deleted from the list, extra expense may be wasted or people who are not customers can be disturbed. On the other hand, for the customers who have moved to other addresses, it is possible to redundantly phone the old and the new numbers to cause waste both in time and cost.

In view of the above described problems in the conventional cleaning method, the present applicant has proposed a method and system for automatic and effective cleaning of a telephone number list as disclosed in U.S. Pat. No. 5,796,816 issued on Aug. 18, 1998. The proposed system utilizes advanced bearer services provided by an ISDN integrally connected with the existing public telephone network to process cleaning of a telephone number list accurately and quickly. More specifically, the cleaning system is connected with an ISDN to process circuit-switched call control procedures defined in the ITU-T recommendation Q.931 as a calling terminal. A SETUP message is sent to a telephone number retrieved sequentially from a telephone number list to be cleaned as a called party number. The SETUP message includes an unrestricted or a restricted digital information in a "bearer capability" information element to the network in the process.

The present applicant has conducted a series of functional tests of the above system to find that the system satisfactorily functions if the called parties are within an identical network, i.e., subscribe to the same service provider as the system. However, the present applicant also experienced that the system often failed to correctly receive the reply message from a destination where the SETUP message is carried over different service providers to the called parties. This seems due to different ISDN services offered by the respective service providers, which may interrupt the digital information at the interfaces therebetween.

DISCLOSURE OF THE INVENTION

It is an object of the present invention to provide an automatic and efficient cleaning method for a telephone number list and a system therefor, which can properly perform a process of deleting null telephone numbers using a personal computer or the like, without making phone calls on actual business basis to the subscribers to different service providers.

A cleaning method for a telephone number list and a system therefor according to the present invention, including an apparatus such as a personal computer, comprises each of the following elements (1)–(5).

(1) The system is connected with an ISDN to process circuit-switched call control procedures defined in the ITU-T recommendation Q.931 as a calling terminal.

(2) A telephone number is retrieved sequentially from a telephone number list to be cleaned as a called party number to send a SETUP message including an information selected from the group consisting of SPEECH and AUDIO in a "bearer capability" information element to the network.

(3) When the network receives the SETUP message sent and transfers an "alerting" or "connect" message, the system immediately sends a "disconnect" message to the network to perform a disconnect and release sequence and determine the called party number in the SETUP message effective.

(4) When the network does not receive the SETUP message sent and transfers a "disconnect" message, the system immediately performs a disconnect and release sequence and obtains a cause display in an information element of the "disconnect" message from the network to determine the called party number in the SETUP message either effective or null according to the cause display.

(5) A new telephone number list is generated, which includes the telephone numbers determined effective and the telephone numbers determined null, separately.

The cleaning system according to the present invention may comprise an additional element of obtaining a new telephone number filled in a diagnosis information field appended to the cause in case that the cause transferred from the network includes "Number changed", and replacing the numbers in the SETUP message to generate a revised list with the obtained new telephone numbers. Furthermore, it may be more appropriate to defer to determine whether each of the numbers is effective or null and to put the deferred numbers in a deferred number list depending on the contents of the cause. It is possible to perform more proper cleaning of the telephone number list by checking the deferred numbers after a while.

BEST MODE FOR CARRYING OUT THE INVENTION

Basic configuration and operation of the system

Figure 1:
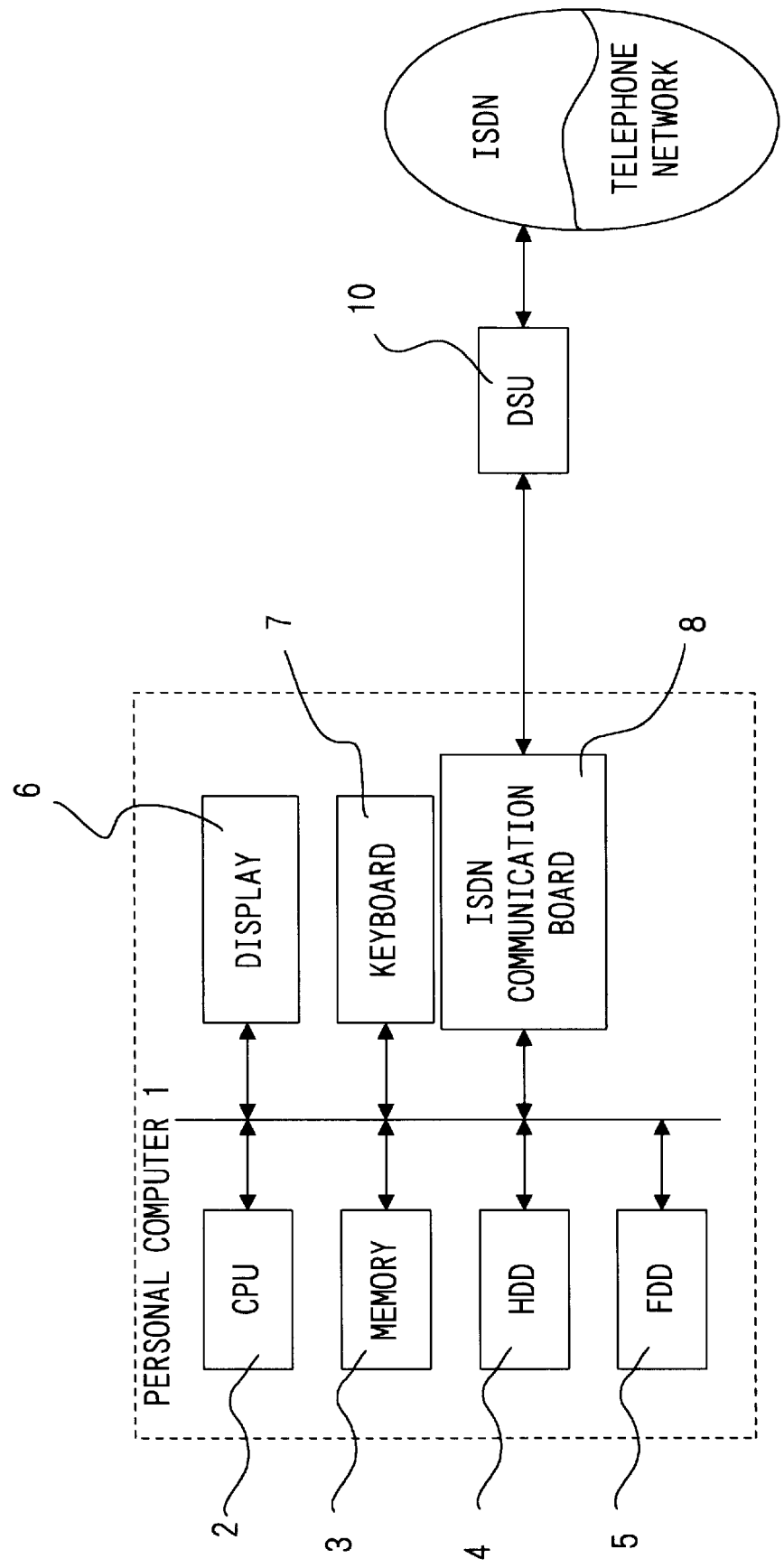
FIG. 1 shows a schematic diagram of a hardware configuration of a cleaning system of a telephone number list according to one embodiment of the present invention.

A system configuration according to one embodiment of the present invention is shown in FIG. 1. A typical personal computer 1 is employed as an ISDN terminal. The personal computer 1 comprises a CPU 2, a memory 3, a hard disk drive 4, a floppy disk drive 5, a display 6, a keyboard 7, an ISDN communication board 8 and so forth. The personal computer 1 is connected to an ISDN via the ISDN communication board 8 and a digital signal unit (DSU) 10. The ISDN, as is commonly known, is connected to a public telephone network integrally and mutually.

Figure 2:
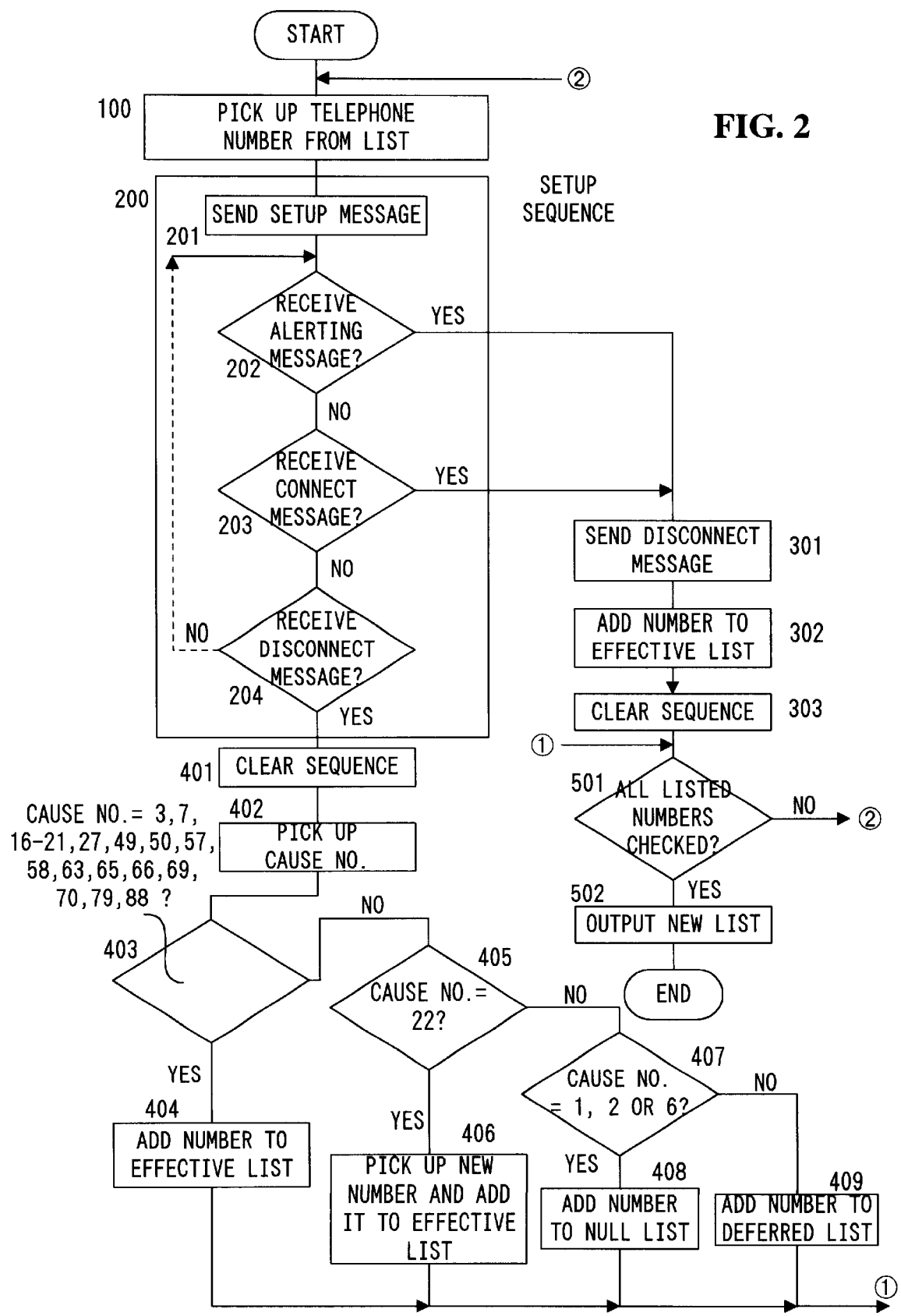
FIG. 2 is a flow chart showing a principal portion of a cleaning process according to the system in FIG. 1.

A telephone number list to be cleaned is stored in a floppy disk in a predetermined format for preparation of cleaning. The floppy disk is then inserted in the floppy disk drive 5. Cleaning command is provided with the personal computer 1 via the keyboard 7 by indicating a file name of the telephone number list to be cleaned. The CPU 2 retrieves the indicated list correspondent to the indicated file name to store it in the memory 3. Subsequently, the cleaning process shown in the flow chart in FIG. 2 is started.

First, one telephone number is picked up from the telephone number list according to a predetermined sequence and processing of a setup sequence is started (Steps 100 to 200). In the setup sequence, the picked up telephone number from the list is defined as a called party number first, and a SETUP message designating a SPEECH or an AUDIO such as "3.1 kHz AUDIO" as a bearer capability is generated to be sent to a network (Step 201). The setup sequence 200 is processed according to a circuit-switched call control procedure defined in the ITU-T recommendation Q.931 in detail. Detailed description of the circuit-switched call control procedure would be omitted in this specification since a number of references provide precise explanation on it. A typical sequence of the procedure is processed as follows.

The network, which received a SETUP message from a calling terminal, sends a CALL PROCEEDING message to the calling terminal, reporting a selected B-channel and also sends the SETUP message to a called terminal. Through this process, various capabilities required to the called terminal are designated. The called terminal side checks the capabilities to confirm which of the called terminals meets the required capabilities. The called terminal determined to meet the requirements sends back an ALERTING message to the network. (The called terminal indicates alerting.) The ALERTING message is sent to the calling terminal from the network. A CONNECT message is sent to the calling terminal from the called terminal via the network when the called terminal responds an off-hook. A CONNECT ACKNOWLEDGE message is sent from the calling terminal to the network, and from the network to the called terminal in response to the CONNECT message. According to the above sequence, the SETUP message is accepted and the two terminals are connected.

In some cases, a call requested from the calling terminal may not be accepted for various reasons. The network sends a DISCONNECT message to the calling terminal to perform a clearing sequence for those cases. The reason why the call was not accepted is reported to the calling terminal as a cause number in a cause of an information element attached to the DISCONNECT message sent to the calling terminal from the network.

Cause in a DISCONNECT message

In the ITU-T Recommendation Q.931, classes and numbers of cause displays attached to DISCONNECT messages are defined as follows.

1. Normal Class

[Cause No. 1—Unallocated (unassigned) number]

This cause indicates that the called party cannot be reached because, although the called party number is in a valid format, it is not currently allocated (assigned).

[Cause No. 2—No route to specified transit network]

This cause indicates that the equipment sending this cause has received a request to route the call through a particular transit network which it does not recognize. The equipment sending this cause does not recognize the transit network either because the transit network does not exist or because that particular transit network, while it does exist, does not serve the equipment which is sending this cause.

[Cause No. 3—No route to destination]

This cause indicates that the called party cannot be reached because the network through which the call has been routed does not serve the destination desired.

[Cause No. 6—Channel unacceptable]

This cause indicates that the channel selected as a result of channel selecting is not acceptable to the calling party.

[Cause No. 7—Call awarded and being delivered in an established channel]

This cause indicates that the user has been awarded the incoming call, and that the incoming call is being connected to a channel already established to that user for similar calls (e.g. packet-mode X.25 virtual calls).

[Cause No. 16—Normal all clearing]

This cause indicates that the call is being cleared because one of the users involved in the call has requested that the call be cleared. Under normal situations, the source of this cause is not the network.

[Cause No. 17—User busy]

This cause is used to indicate that the called party is unable to accept another call because the user busy condition has been encountered. In this case, it is noted that the user equipment is compatible with the call.

[Cause No. 18—No user responding]

This cause is used when a called party does not respond to a call establishment message with either an alerting or connect indication within the prescribed period of time allocated (Expiry of the timer T303 or T310 defined in the Recommendation).

[Cause No. 19—No answer from user (user alerted)]

This cause is used when the called party has been alerted but does not respond with a connect indication within a prescribed period of time. This cause is not necessarily generated by JT-Q931 procedures but may be generated by internal network timers.

[Cause No. 20—Subscriber absent]

This cause value is used when a mobile station has logged off with a signalling procedure through a radio bus, or an radio communication is unable to establish with a mobile station (due to interference, out of range, power off, and so forth).

[Cause No. 21—Call rejected]

This cause indicates that the equipment sending this cause does not wish to accept this call, although it could have accepted the call because the equipment sending this cause is neither busy nor incompatible.

[Cause No. 22—Number changed]

This cause is returned to a calling party when the called party number indicated by the calling party is no longer assigned. The new called party number may optionally be included in the diagnostic field.

[Cause No. 26—Non-selected user clearing]

This cause indicates that the user has not been awarded the incoming call.

[Cause No. 27—Destination out of order]

This cause indicates that the destination indicated by the user cannot be reached because the interface to the destination is not functioning correctly. The term "not functioning correctly" indicates that a signalling message was unable to be delivered to the remote party; e.g. a physical layer or data link layer failure at the remote party, or user equipment off-line.

[Cause No. 28—Invalid Number Format (address incomplete)]

This cause indicates that the called party cannot be reached because the called party number is not in a valid format or is not complete.

[Cause No. 29—Facility rejected]

This cause is returned when a facility requested by the user cannot be provided by the network.

[Cause No. 30—Response to STATUS ENQUIRY]

This cause is included in the STATUS message when the reason for generating the STATUS message was the prior receipt of a STATUS ENQUIRY message.

[Cause No. 31—Normal, unspecified]

This cause is used to report a normal event only when no other cause in the normal class applies.

2. Resource Unavailable Class

[Cause No. 34—No Circuit/channel available]

This cause indicates that there is no appropriate circuit/channel presently available to handle the call.

[Cause No. 38—Network out of order]

This cause indicates that the network is not functioning correctly and that the condition is likely to last a relatively long period of time; e.g. immediately re-attempting the call is not likely to be successful.

[Cause No. 41—Temporary failure]

This cause indicates that the network is not functioning correctly and that the condition is not likely to last a long period of time; e.g. the user may wish to try another call attempt almost immediately.

[Cause No. 42—Switching equipment congestion]

This cause indicates that the switching equipment generating this cause is experiencing a period of high traffic.

[Cause No. 43—Access information discarded]

This cause indicates that the network could not deliver access information to the remote user as requested, i.e. user-to-user information, low layer compatibility, high layer compatibility, or sub-address, as indicated in the diagnostic. It is noted that the particular type of access information discarded is optionally included in the diagnostic.

[Cause No. 44—Requested circuit/channel not available]

This cause is returned when the circuit or channel indicated by the requesting entity cannot be provided by the other side of the interface.

[Cause No. 47—Resource unavailable, unspecified]

This cause is used to report a network congestion event only when no other cause in the network congestion class applies.

3. Service or Option Unavailable Class

[Cause No. 49—QOS not available]

This cause is used to report that the requested QOS, as defined in Recommendation X.213, cannot be provided (e.g. throughput or transit delay cannot be supported).

[Cause No. 50—Requested facility not subscribed]

This cause indicates that the supplementary service requested is not provided by the network because the user has not completed the necessary procedure for administration.

[Cause No. 57—Bearer capability not authorized]

This cause indicates that the user has requested a bearer capability which is implemented by the equipment which generated this cause but the user is not authorized to use.

[Cause No. 58—Bearer capability not presently available]

This cause indicates that the user has requested a bearer capability which is implemented by the equipment which generated this cause but which is not available at this time.

[Cause No. 63—Service or option not available, unspecified]

This cause is used to report a service or option not available event only when no other cause in the service or option not available class applies.

4. Service not Implemented Class

[Cause No. 65—Bearer capability not implemented]

This cause indicates that the equipment sending this cause does not support the bearer capability requested.

[Cause No. 66—Channel type not implemented]

This cause indicates that the equipment sending this cause does not support the channel type requested.

[Cause No. 69–Requested facility not implemented]

This cause indicates that the equipment sending this cause does not support the requested supplementary service.

[Cause No. 70—Only restricted digital information bearer capability is available]

This cause indicates that an equipment has requested an unrestricted bearer service but that the equipment sending this cause only supports the restricted version of the requested bearer capability.

[Cause No. 79—Service or option not implemented, unspecified]

This cause is used to report a service or option not implemented event only when no other cause in the service or option not implemented class applies.

5. Invalid Message Class

[Cause No. 81—Invalid call reference value]

This cause indicates that the equipment sending this cause has received a message with a call reference which is not currently in use on the user-network interface.

[Cause No. 82—Invalid channel number]

This cause indicates that the equipment sending this cause has received a request to use a channel not activated on the interface for a call. For example, if a user has subscribed to those channels numbered from 1 to 12 and the user equipment or the network attempts to use channels 13 through 23, this cause is generated.

[Cause No. 83—A suspended call exists, but this call identity is not in use]

This cause indicates that a call resume has been attempted with a call identity which differs from that in use for any presently suspended call(s).

[Cause No. 84—Suspended call identity in use]

This cause indicates that the network has received a call suspended request containing a call identity (including the null call identity) which is already in use for a suspended call within the domain of interfaces over which the call might be resumed.

[Cause No. 85—No call Suspended]

This cause indicates that the network has received a call resume request containing a call identity information element which presently does not indicate any suspended call within the domain of interfaces over which calls may be resumed.

[Cause No. 86—Call having the requested call identity has been cleared]

This cause indicates that the network has received a call resume request containing a call identity information element indicating a suspended call that has in the meantime been cleared while suspended (either by network time-out or by the remote user).

[Cause No. 87—User not member of CUG]See the specification of a supplementary service.

[Cause No. 88—Incompatible destination]

This cause indicates that the equipment sending this cause has received a request to establish a call which has low layer compatibility, high layer compatibility, or other compatibility attributes (e.g. data rate) which cannot be accommodated.

[Cause No. 91—Invalid transit network selection]

This cause indicates that a transit network identification was received which is of an incorrect format as defined separately.

[Cause No. 95—Invalid message, unspecified]

This cause is used to report an invalid message event only when no other cause in the invalid message class applies.

6. Protocol error (e.g. unknown message) class

[Cause No. 96—Mandatory information element is missing]

This cause indicates that the equipment sending this cause has received a message which is missing an information element which must be present in the message (a mandatory information element) before that message can be processed.

[Cause No. 97—Message type non-existent or not implemented]

This cause indicates that the equipment sending this cause has received a message with a message type it does not recognize either because this is a message not defined or defined but not implemented by the equipment sending this cause.

[Cause No. 98—Message not compatible with call state or message type non-existent]

This cause indicates that the equipment sending this cause has received a message such that the procedures do not indicate that this is a permissible message to receive while in the call state, or a STATUS message was received indicating an incompatible call state.

[Cause No. 99—Information element non-existent]

This cause indicates that the equipment sending this cause has received a message which includes information element(s) not recognized because the information element identifier(s) are not defined or are defined but not implemented by the equipment sending the cause. However, the information element is not required to be present in the message in order for the equipment sending the cause to process the message.

[Cause No. 100—Invalid information element contents]

This cause indicates that the equipment sending this cause has received an information element which it has implemented; however, one or more fields in the information element are coded in such a way which has not been implemented by the equipment sending this cause.

[Cause No. 101—Message not compatible with call state]

This cause indicates that a message has been received which is incompatible with the call state.

[Cause No. 102—Recovery on timer expiry]

This cause indicates that a procedure has been initiated by the expiry of a timer in association with error handling procedures of the layer 3 specification.

[Cause No. 111—Protocol error, unspecified]

This cause is used to report a protocol error event only when no other cause in the protocol error class applies.

7. Interworking class

[Cause No. 127—Interworking, unspecified]

This cause indicates that there has been interworking with a network which does not provide causes for actions it takes. Thus, the precise cause for a message which is being sent cannot be ascertained.

Flow of Cleaning Process Control

As shown in the flow chart in FIG. 2, in the cleaning process of the present invention, when the network has received a call including a SETUP message sent by the calling party and send back an ALERTING or CONNECT message in the setup sequence 200, the step 202 or 203 to steps 301, 302, 303 are processed. Then, the calling party immediately sends a DISCONNECT message to the network to perform a clear sequence, and the telephone number in the SETUP message is determined effective and is added to an effective telephone number list. Through the preceding steps, confirmation of a telephone number is completed.

When a DISCONNECT message is sent by the network because the SETUP message sent by the calling party is not accepted in the setup sequence 200, the step 204 to steps 401, 402 are processed. The calling party immediately performs a clear sequence and picks up a cause number of the information element attached to the DISCONNECT message sent by the network. The telephone number in the SETUP message is determined either effective, null, or deferred, according to the cause.

(a) Effective Telephone Numbers

If the cause number picked up in step 402 conforms to either of the following ones, the telephone number in the SETUP message is determined effective and is added to an effective telephone number list (Steps 403 to 404).

[Cause No. 3—No route to destination]
[Cause No.7—Call awarded and being delivered in an established channel]
[Cause No. 16—Normal call clearing]
[Cause No. 17—User busy]
[Cause No. 18—No user responding]
[Cause No. 19—No answer from user (user alerted)]
[Cause No. 20—Subscriber absent]
[Cause No. 21—Call rejected]
[Cause No. 27—Destination out of order]
[Cause No. 49—QOS not available]
[Cause No. 50—Requested facility not subscribed]
[Cause No. 57—Bearer capability not authorized]
[Cause No. 58—Bearer capability not presently available]
[Cause No. 63—Service or option not available, unspecified]
[Cause No. 65—Bearer capability not implemented]
[Cause No. 66—Channel type not implemented]
[Cause No. 69—Requested facility not implemented]
[Cause No. 70—Only restricted digital information bearer]
[Cause No. 79—Service or option not implemented, unspecified]
[Cause No. 88—Incompatible destination]

(b) Number Changed

When the cause number picked up in step 402 corresponds to [Cause No. 22—Number changed], a new telephone number contained in a diagnosis information field of the cause is retrieved to be added to the effective telephone number list (Steps 403, 405, to 406).

(c) Null Telephone Number

If the cause number picked up in step 402 conforms to either of the following ones, the telephone number in the SETUP message is determined null and is added to a null telephone number list. (Steps 403, 405, 407 to 408)

[Cause No. 1—Unallocated (unassigned) number]
[Cause No. 2—No route to specified transit network]
[Cause No. 6—Channel unacceptable]

(d) Determination Deferred

If the cause number picked up in step 402 does not correspond to either of the cause numbers depicted in any of steps 403, 405, or 407, the telephone number in the SETUP message is not determined either effective or null and is added to a deferred telephone number list (Steps 403, 405, 407 to 409).

If inspection of one telephone number is completed through the preceding steps, step 501 is performed to confirm if all the telephone number contained in the telephone number list which is to be cleaned have been checked. If not, the process is returned to the first step 100 to inspect the subsequent telephone number through the above described sequence. If all the telephone numbers in the list have been checked, step 502 is performed to output a revised list in a predetermined format.

Situation of Actual Operation

The telephone number lists which are to be cleaned according to the present invention typically comprise a telephone number list in a customer list used for telemarketing or the like. In today's Japan, most of the telephone numbers included in such lists are those of subscribers to an analog telephone network. However, recently, the number of subscribers of an ISDN (INS64™) is gradually increasing. In case that the telephone number list in this current situation is cleaned through the above processes, the following communications will be made between the cleaning system of the present invention and the ISDN station (the network).

(A) Called party number is an effective subscriber number of an analog telephone network.

The number of this case seems to have a great majority. The system of the present invention sends a SETUP message containing a SPEECH or AUDIO designated as a bearer capability, thus the network sends the SETUP message to a called terminal. The called terminal side checks the capabilities to confirm the required capabilities and sends back an ALERTING message to the network to the calling terminal. Or, a CONNECT message is sent to the calling terminal via the network. Then, the calling party immediately sends a DISCONNECT message to the network to perform a clear sequence, and the telephone number in the SETUP message is determined effective and is added to an effective telephone number list. Thus the telephone sets having effective telephone numbers which are connected to an analog telephone network can be confirmed with instantly alerting or without alerting the telephone sets. Therefore, disturbance to the called party will be minimized by a useless call.

(B) Called party number has changed.

In this case, the network sends back a DISCONNECT message containing [Cause No. 22—Number changed], without respect to the fact whether the subscriber number is of an analog telephone network or of an ISDN. The cleaning system receives the message and picks up a new telephone number contained in a diagnosis information field of the cause, and adds the retrieved number to the effective number list.

(C) The called party number is not currently in use.

In this case, the network sends back a DISCONNECT message containing [Cause No. 1—Unallocated (unassigned) number], without respect to the fact whether the subscriber number is of an analog telephone network or of an ISDN. The cleaning system receives the message to add the called party number to the null number list.

(D) The called party number is an effective subscriber number to an ISDN.

In this case, mode of communication between two parties depends on the condition of the facility at the called party. The called terminal (called party) is alerted by the CALLING message sent from the present cleaning system. If the called party responds the alerting, step 301 is processed in the flow chart in FIG. 2. The cleaning system starts a clear sequence and adds the called party number to the effective number list. In case that a DISCONNECT message is sent back from the network, if the cause number in the DISCONNECT message conforms to either of #7, #16, #17, #18, #19, #20, #21, #27, #49, #50, #57, #58, #63, #65, #66, #70, #79, the called party number is added to the effective number list, and if the cause number corresponds to #2 or #6, the called party number is added to the null number list. If the cause number in the DISCONNECT message does not corresponds to any of the above cause numbers, the called party number is included in the deferred number list.

It should be noted that the ways of classification of the called party number into the categories "effective", "null", or "deferred" according to the cause number may not be best described in the preferred embodiment. It may be more appropriate to classify some cause in "effective" or "null" than in "deferred", based on more precise investigation of usage of an ISDN by the subscribers and response of the network to the subscribers. The present invention would never restrict such flexible operations of the cleaning system.

As discussed above in detail, according to the present invention, it is possible to delete null telephone numbers automatically and efficiently without processing any actual business activities (certain business transactions with customers) according to the telephone number list to be cleaned.

That is, such waste or inconvenience are able to be avoided as performing certain business activities to invalid customers to be deleted from the list or annoying irrelevant people other than customers.

Big advantage with the present invention is that validity of the telephone sets having effective telephone numbers respectively, which are connected to an analog telephone network and are estimated as the greatest in number, can be confirmed with instantly alerting or without alerting the telephone sets. Therefore, from the called party's point of view, who has a number to be checked, disturbance to the called party will be minimized by a useless call to which the called party inevitably responds. Furthermore, it is no longer necessary to separate the subscribers to an ISDN rapidly becoming popular among homes from the subscribers to a conventional analog telephone network included in a telephone number list to be cleaned, thus rapid cleaning of the telephone number list has been achieved.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A cleaning system for a telephone number list including a computer such as a personal computer, comprising the following elements of: being connected with an ISDN to process circuit-switched call control procedures defined in the ITU-T recommendation Q.931 as a calling terminal; retrieving a telephone number sequentially from a telephone number list to be cleaned as a called party number to send a SETUP message including an information selected from the group consisting of SPEECH and AUDIO in a bearer capability information element to the network; sending a DISCONNECT message to the network immediately to perform a clear sequence and determining the called party number in the SETUP message effective when the network receives the SETUP message sent and transfers an ALERTING or CONNECT message sent from a called terminal having the effective called party number which is a subscriber number from a group consisting of an analog telephone network and an ISDN; performing a clear sequence immediately and obtaining a cause in an information element of the DISCONNECT message from the network to determine the called party number in the SETUP message either effective or null according to the cause when the network does not receive the SETUP message sent and transfers a DISCONNECT message; and generating a new telephone number list, which includes the telephone numbers determined effective and the telephone numbers determined null, separately.

2. A cleaning system of a telephone number list as set forth in claim 1, said system retrieving a new telephone number contained in a diagnosis information field attached to the cause, and generating a new telephone number list in which the telephone numbers in the SETUP message has been replaced with the retrieved number in case that the network sends back the cause containing "Number changed".

3. A cleaning system of a telephone number list as set forth in claim 1, said system deferring to determine if the telephone number is effective or null and including the telephone number in a deferred number list.

4. A method for cleaning a telephone number list wherein said telephone number is cleaned and updated according to the cleaning system as set forth in claim 1.

* * * * *